(12) United States Patent
Moon

(10) Patent No.: US 7,367,243 B1
(45) Date of Patent: May 6, 2008

(54) TRAPS AND VENTS IN FLOW-THROUGH PIPET

(76) Inventor: Randall A. Moon, 8804 S. 15th St., Fort Smith, AR (US) 72908

( * ) Notice: Subject to any disclaimer, the term of this patent is extended or adjusted under 35 U.S.C. 154(b) by 0 days.

(21) Appl. No.: 11/169,186

(22) Filed: Jun. 28, 2005

Related U.S. Application Data

(63) Continuation-in-part of application No. 10/208,420, filed on Jul. 30, 2002, now Pat. No. 6,948,390.

(51) Int. Cl.
*G01N 1/00* (2006.01)

(52) U.S. Cl. ................................. 73/863.71

(58) Field of Classification Search ............ 73/863.71, 73/863.72, 863.73, 864.01, 426–429
See application file for complete search history.

(56) References Cited

U.S. PATENT DOCUMENTS

| | | | |
|---|---|---|---|
| 1,204,368 A | 11/1916 | Lowy | |
| 1,520,637 A | 12/1924 | Frank | |
| 1,555,467 A * | 9/1925 | Graham | 137/585 |
| 1,823,276 A * | 9/1931 | Lucius | 222/573 |
| 2,233,818 A | 3/1941 | Matter | 137/34.2 |
| 2,434,723 A | 1/1948 | Shook | 73/421 |
| 3,415,380 A | 12/1968 | Ellis | 210/202 |
| 3,888,126 A * | 6/1975 | Cross | 73/426 |
| 3,992,947 A | 11/1976 | Thiemann et al. | 73/421 |
| 4,043,490 A | 8/1977 | McKinney | 222/442 |
| 4,061,253 A * | 12/1977 | Rockefeller | 222/442 |
| 4,265,118 A * | 5/1981 | Griesel | 73/427 |
| 4,273,271 A * | 6/1981 | Tiger | 222/454 |
| 4,476,095 A | 10/1984 | Scott et al. | 422/75 |
| 4,624,147 A | 11/1986 | Kenney | 73/864.15 |
| 5,090,255 A | 2/1992 | Kenney | 73/1 |
| 5,121,642 A | 6/1992 | Davidowicz et al. | 73/864.11 |
| 5,220,799 A * | 6/1993 | Lievens et al. | 62/48.2 |
| 5,271,902 A | 12/1993 | Sakka et al. | 422/100 |
| 5,358,152 A * | 10/1994 | Banks | 222/442 |
| 5,373,957 A * | 12/1994 | Gryc | 220/86.1 |
| 5,487,313 A * | 1/1996 | Johnson | 73/863.71 |
| 5,679,575 A | 10/1997 | Kubota et al. | 436/49 |
| 5,763,278 A | 6/1998 | Sickinger et al. | 436/180 |

(Continued)

FOREIGN PATENT DOCUMENTS

DE          743 701          12/1943          ................. 421/302

(Continued)

Primary Examiner—Robert Raevis
(74) Attorney, Agent, or Firm—Fellers, Snider, Blankenship, Bailey & Tippens

(57) ABSTRACT

This invention relates generally to a volumetric pipet used to make a volumetric measurement and transfer a measured amount of liquid. More specifically the invention relates to a pipet that fills from the top, works well with automated systems because it does not require positioning devices or a supply of suction, is easy to rinse and rinses upon filling, and meets the precision requirements of class A volumetric glassware. The pipette of the invention may include a chamber for manipulation of the liquid before pipetting. The pipet is capable of delivering a repeatable predetermined volume of fluid, fills from the top and dispenses from the bottom, which eliminates a need for suction to fill the pipet. The pipet does not trap air in the measuring chamber and works without any valves making contact the sample liquid in the measuring chamber.

8 Claims, 10 Drawing Sheets

U.S. PATENT DOCUMENTS

| | | | |
|---|---|---|---|
| 5,820,824 A | 10/1998 | Tanaka | 422/100 |
| 6,202,484 B1 * | 3/2001 | Willner et al. | 73/290 V |
| 6,253,628 B1 | 7/2001 | Steele et al. | 73/864.15 |
| 6,546,819 B1 * | 4/2003 | Schadt et al. | 73/863.71 |
| 6,948,390 B2 * | 9/2005 | Moon | 73/863.32 |
| 2005/0199077 A1 * | 9/2005 | Prybella et al. | 73/863.86 |

FOREIGN PATENT DOCUMENTS

| | | | |
|---|---|---|---|
| DE | 23 46 793 | 3/1975 | |
| DE | 929 333 | 6/1995 | 421/302 |
| FR | 1 105 300 | 11/1955 | 3/12 |
| GB | 1 052 748 | 12/1966 | |
| JP | 2001-320988 | * 11/2001 | |

* cited by examiner

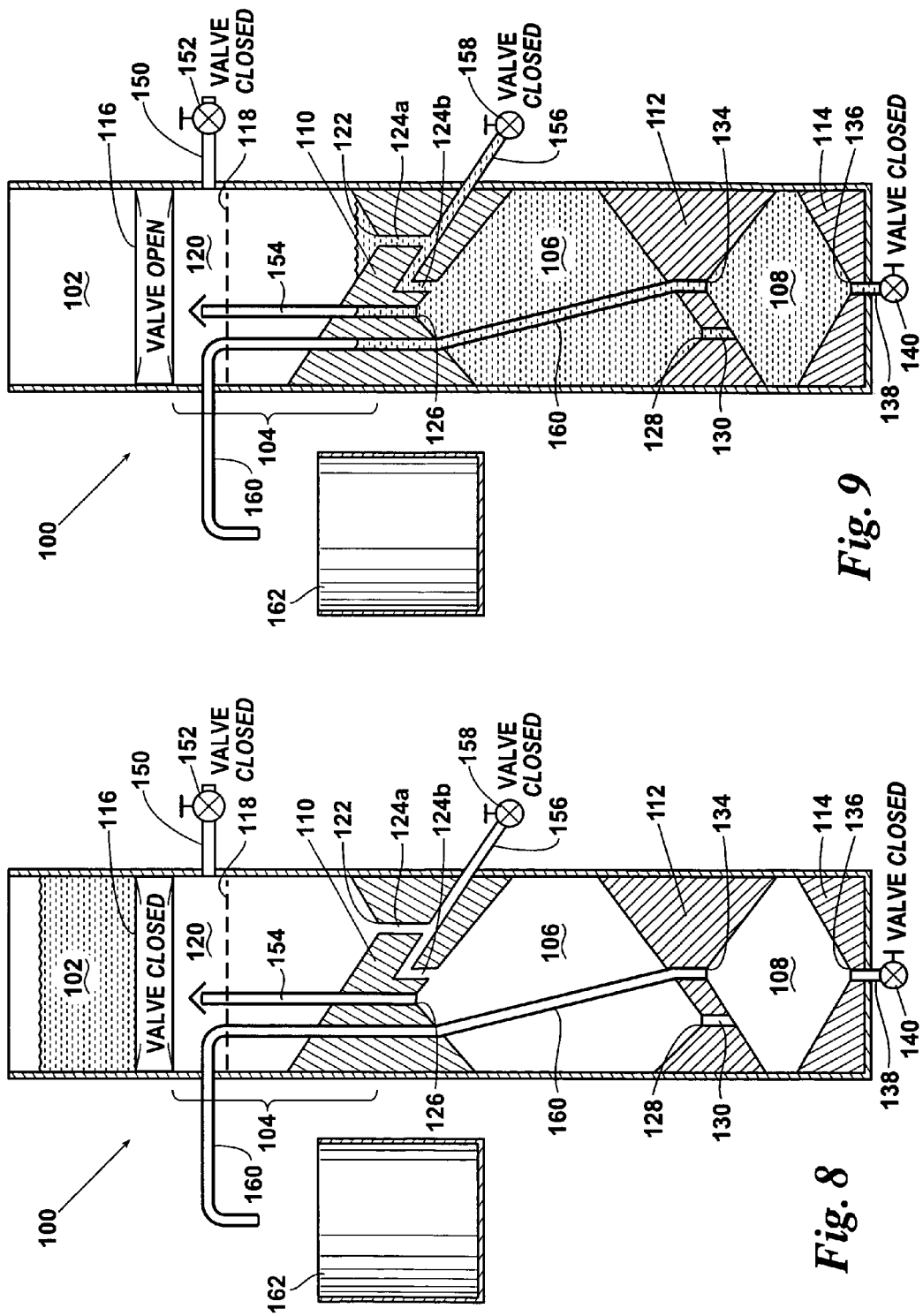

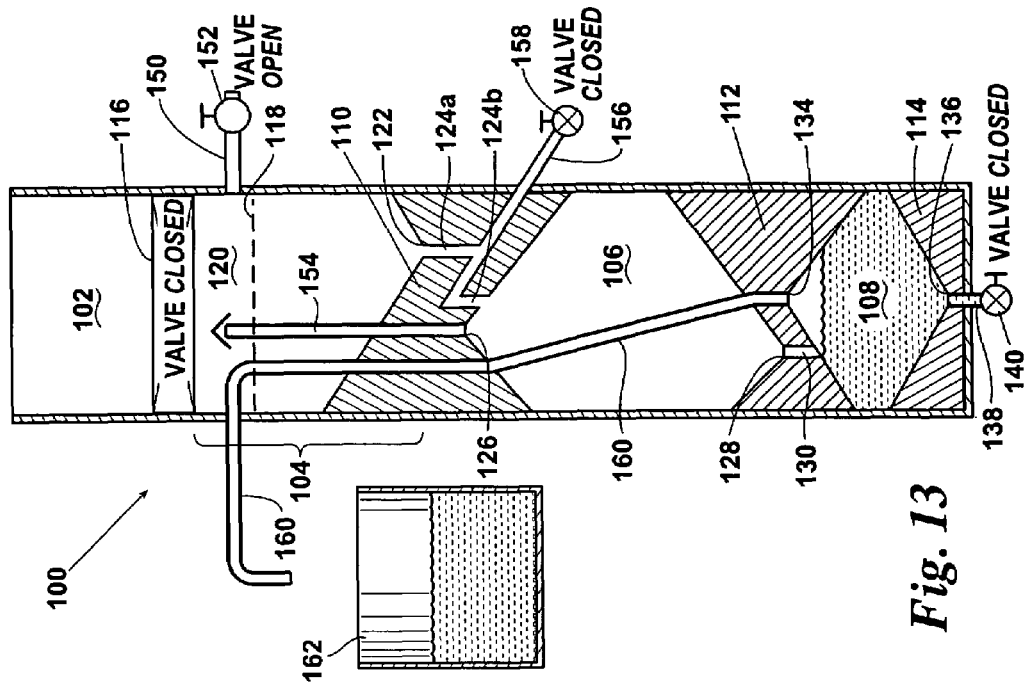
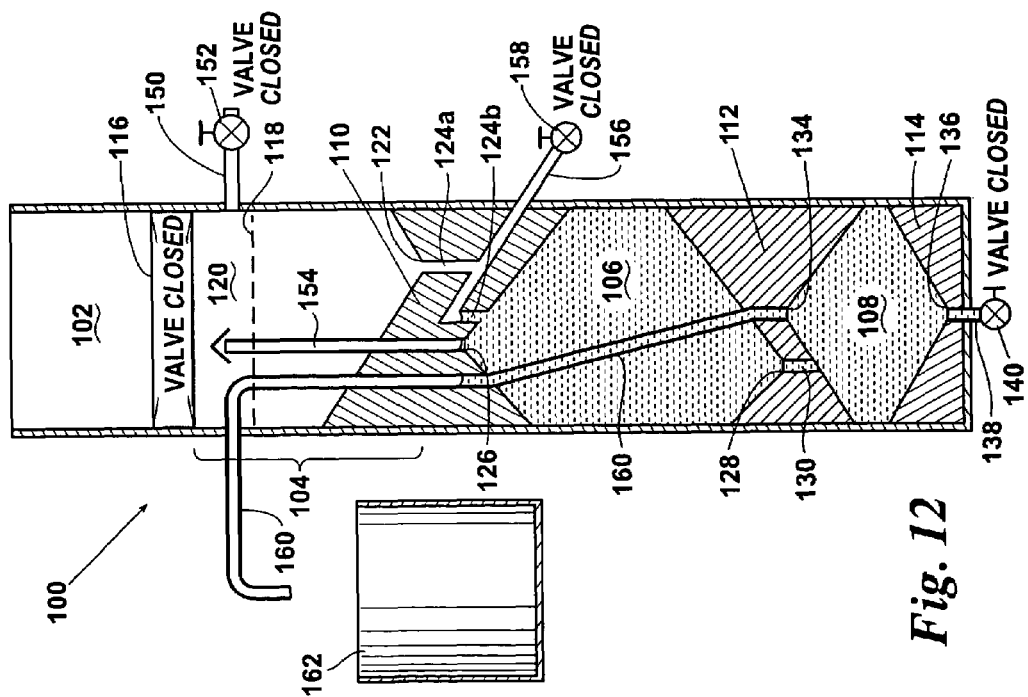

TRAPS AND VENTS IN FLOW-THROUGH PIPET

CROSS-REFERENCE TO RELATED APPLICATION

This application claims the benefit of copending U.S. patent application Ser. No. 10/208,420 entitled FLOW THROUGH PIPET filed Jul. 30, 2002.

FIELD OF THE INVENTION

This invention relates generally to a volumetric pipet used to make a volumetric measurement and transfer a measured amount of liquid. More specifically the invention relates to a pipet that fills from the top, works well with automated systems because it does not require positioning devices or a supply of suction, is easy to rinse and rinses upon filling, and meets the precision requirements of class A volumetric glassware. The pipette of the invention may also include a chamber for manipulation of the liquid before pipetting.

BACKGROUND OF THE INVENTION

Pipets are used to extract, measure and transfer a volume of liquid. A common pipet design is a cylindrical vessel open at both ends, like a drinking straw, with a mark to indicate a predefined volume and a means to apply suction and pressure to one end of the cylinder. In use, suction is applied to draw liquid into the pipet from a reservoir. The pipet is then moved to a receiving vessel and pressure or gravity empties measured volume.

An important concept in volumetric measurement of liquid is that precision can be increased by reducing the diameter of the cylinder at the upper limit of the liquid. This is seen in volumetric flasks, which have a large diameter base and a smaller diameter neck at the top. Volumetric pipets are usually cylindrical, as previously stated. However, volumetric pipets may have a large diameter section, e.g., in the middle, so that the pipet can hold more volume, although the area of the pipet corresponding to the limiting point for the liquid is typically narrowed again. Stated another way, reducing the surface area of the meniscus increases the accuracy.

Most pipets fill from the bottom end, while pressure and suction are applied at the upper end. This configuration has the advantage of minimizing the surface area of the boundary between the liquid and the air, thereby maintaining precision. Another advantage of this simple yet effective device is that the liquid to be measured does not contact any valves. The liquid is suspended in the pipet with suction. A disadvantage associated with the use of valves is that valves have mating surfaces, seats, and fittings having irregular surfaces that are likely to retain the liquid, reduce precision and make the device more difficult to rinse.

One disadvantage of the bottom fill pipet described above is that the pipet must be moved with each cycle of operation from the fill location to the dispense location. Another disadvantage is that the pressure and suction must be carefully controlled.

In addition to manual pipets, automated pipet systems have been developed. An example automated pipet system may include a syringe, a stepper motor, a three-way valve to select between intake and dispense functions, and equipment necessary to move the pipet vertically in and out of a fluid as well as equipment necessary to move the pipe horizontally from an intake location to a dispense location. Although a means to apply pressure and suction has been automated and the movement of the pipet in the x and y directions has been automated, typically the same basic design is used, wherein a cylindrical vessel is opened at both ends. Examples of typical "glass straw" pipet vessels may be found in U.S. Pat. Nos. 3,992,947, 4,476,095, 4,624,147, 5,090,255, 5,271,902, 5,679,575, 5,820,824, and 6,253,628.

Other known pipette designs include the unitary filter-pipette taught in U.S. Pat. No. 3,415,380 to Ellis. The Ellis pipette fills from the top and has the advantage of a measuring chamber that, by its design, holds a limited amount of liquid, making the volumetric measurement automatic. Ellis teaches a manual pipet.

One drawback associated with Ellis is that liquid may continue to enter the measuring chamber from the filter and its funnel while the pipet is emptying, which will compromise the accuracy. Additionally, liquid is supported by a valve at the bottom of the measuring chamber, which will reduce precision and complicate rinsing. Rinsing requires either moving the device or replacing the receiving vessel after rinsing because the rinse media exits the device through the same port as measured liquid.

The above described accuracy limitations make the Ellis device inappropriate for high precision applications. Having to position the device for rinsing makes the Ellis device less suitable for automation.

U.S. Pat. No. 2,434,723 to Shook describes a Means for Measuring Volumetric Samples in that has the feature of isolating measure liquid between two valves. Shook teaches a manual rather than automated pipet.

Shook's device does not provide a clear or separate path for displaced air to evacuate when filled from the top. Rinsing is required between the fill and dispense operations. Otherwise, liquid will continue to enter the measuring chamber from the vessel above the uppermost valve while the measured liquid is emptying. Rinsing requires either moving the device or replacing the receiving vessel after rinsing, or turning a valve to select a separate passage for the rinse media. This device has a valve below and another above the measuring chamber. These valves will reduce precision and complicated rinsing.

German Patent No. 929,333 to Altmann describes a buret. The Altmann device fills from the top, using pressure or suction to fill from a supply reservoir that is at a lower elevation than the full mark of the buret. Altmann teaches that the buret is filled with excess fluid, then gravity and a siphon effect return the excess to a supply reservoir.

The Altmann device has a valve at the lower boundary of the measuring chamber, which will reduce precision and complicate rinsing. The use of pressure or suction requires that a source of pressure or suction be available. The Altmann device delivers the rinse media and the measured liquid through the same opening requiring that the rinse vessel and the sample vessel be moved back and forth. Only one opening is provided in the top of the measuring chamber through which air must evacuate and liquid enter, which limits accuracy. The Altmann buret is shown having a straight cylinder wall. Altmann shows the upper limit of the liquid to be at point D, the delivery tip. Further, Altmann's device requires that air must evacuate the measuring area of the buret and escape through opening H.

U.S. Pat. No. 4,476,095 to Scott describes an automated pipet that includes a motor driven syringe to supply suction, pressure and volumetric measurement, and a device to position the pipet in two locations, i.e., one location for filling the pipet and a second location for delivering the measured liquid. Scott teaches a "drinking straw" style pipet that has been automated and has many limitations. The Scott device is difficult to rinse and rinsing may require disassembly. It is complex because it has a motor driven syringe supplying pressure and suction, and a positioning device. Position devices and motor driven syringes require control circuits, motors, gears and maintenance.

Moon describes a Flow-thru-Pipet in U.S. patent application Ser. No. 10/208,420. The Moon device includes a fill chamber where sample preparation can occur. It uses compressed air to empty the measuring chamber. The Moon pipet fills from the top. The measuring chamber has separate passages to simultaneously fill with liquid and evacuate air. To rinse the device, the receiving vessel must be replaced because the rinse media and measured liquid are dispensed through the same port. The device also has a valve at the lower end of the measuring chamber, which compromises precision and complicates rinsing.

A drawback with bottom fill manual and automated pipets is that fluid is drawn into the pipet and dispensed from the pipet through the same orifice, which is usually located at the lower end of the pipet. Filling and dispensing of fluid from the same orifice in the pipet necessitates locating the pipet in a fluid source to fill the pipet and then relocating the pipet at a dispensing location every time it is desired to dispense a sample of fluid. Consequently, automated pipet systems require complex systems to relocate the pipet from the fluid source to the dispensing location.

Therefore, a pipet is desirable that is capable of delivering a repeatable predetermined volume of fluid, wherein the pipet fills from the top and dispenses from the bottom, i.e., a "flow through" pipet, which would eliminate the need for positioning devices. It is further desirable to provide a top fill pipet that does not trap air in the measuring chamber. Such a pipet could be provided in an automated pipetting system wherein the pipet would not have to be repositioned to a fill location after dispensing a fluid sample, thereby greatly simplifying an automated pipetting system.

It is further desirable to have a system that automates titrations that use volumetric measurement of the sample. There are many titration methods that are specific to a sample and chemical species being measured. Generally a titration method is comprised of four steps: 1) Sample preparation, which may be a chemical addition or physical manipulation of the sample; 2) Sample measurement by weight or volume; 3) Titration, which is the addition of a chemical of known concentration until a desired reaction occurs; and 4) Calculation of the concentration of the sample. Sample preparation may include more than one step and may occur before or after the sample measurement. To summarize, it is desirable to have a system that automates all four steps above and does not require any human input during the sample preparation step through the calculation steps described above.

Therefore, it is desirable to accomplish sample measurement by volume, and to provide a vessel where sample preparation can occur when necessary and prior to sample measurement. Until now, volumetric measurement has been manually accomplished with volumetric pipets, volumetric flasks, and in a limited number of situations with automated pipets.

It is additionally desirable to provide a pipet that includes a vessel or chamber for sample preparation wherein the pipet is capable of dispensing a measured volume that meets the precision requirements of a class A volumetric pipet as specified in ASTM E969-02, which is plus or minus 0.08 milliliters for a 100 ml pipet. One drop of liquid is usually about 0.05 ml. Therefore, the device is accurate to approximately a single drop of fluid.

It is further desirous to eliminate the need for any positioning devices including both devices for moving the pipet and devices for moving the sample vessel or rinse media vessel. Positioning devices are expensive and complex. Therefore it is beneficial to fill the pipet from the top so that gravity can be used to move the liquid to different locations.

It is desirous to eliminate the need for suction to fill the pipet, eliminating the need for an expensive vacuum supply or a suction pump. Therefore, it is beneficial to fill the pipet from the top allowing gravity to fill the pipet. Additionally, it is desirable that the device be configured for effective rinsing, thereby eliminating contamination of one sample by the previous sample. Also, rinsing should be simple and quick for minimizing operator time and skill. The device should be inexpensive to build, maintain and operate.

It is desirous to eliminate valves that contact the sample liquid in the measuring chamber. The "straw" style pipet does not have any valves in contact with the measured liquid. It is desirable to emulate this feature because it will benefit precision.

SUMMARY OF THE INVENTION

In one embodiment, the invention is directed to a flow through pipet for fluid measurement. The pipet of the invention has a body defining an interior space for receiving a fluid. The drain line is provided to drain fluid in the interior space above a drain line inlet, thereby establishing a repeatable upper fluid level in the body. A dispense valve on the lower end of the body selectively permits dispensing of the fluid from the body.

A restriction member may be located in the interior space of the body for defining a passageway. The drain line inlet preferably communicates with the passageway. By locating the drain line inlet in the restriction member passageway, a smaller surface area of an upper surface of the fluid is exposed, thereby minimizing inconsistencies in the fluid level. The drain line inlet establishes an upper end of a measuring chamber and also establishes a lower end of an overflow chamber.

The flow through pipet may further include a vent line that communicates the overflow chamber with the measuring chamber, which allows trapped gas to escape from the measuring chamber during filling of a fluid. A fill valve may be provided in the interior space, wherein the fill valve defines an upper end of an overflow chamber and a lower end of a fill chamber. The fill valve selectively permits fluid to pass from the fill chamber to the overflow chamber.

A compressed gas line may be provided that is in communication with the overflow chamber for delivering compressed gas to the interior space. A junction for separating the body into an upper segment and a lower segment is provided so that the body can be disassembled, thereby permitting the attachment of a lower segment of a desired volume to be affixed to the upper segment.

In use, a fluid is delivered into a measuring chamber through an upper end of a pipet body to fill the measuring chamber with a fluid. Fluid in excess of a predetermined amount is drained out of the drain line. The draining of excess fluid establishes an upper fluid level in the measuring chamber so that a predetermined volume of sample fluid may be established in the measuring chamber. During delivery of the fluid into the measuring chamber, gas may be vented from the measuring chamber via a separate pathway simultaneously to the filling of the measuring chamber with fluid.

Fluid may be delivered into the measuring chamber through an upper end of the body from an attached supply source, which may be desirable in an automated process. Preferably, the filling and delivering steps are achieved without moving the body in an X or Y direction. Compressed gas may be delivered into the body above the sample chamber to force the fluid out of the body or the fluid may be delivered by gravity feed.

In a second embodiment of the invention, a pipet is provided that includes a vessel or chamber for sample preparation. In the pipet of the invention, rinsing is simplified, automation is easier to accomplish and precision is improved. The pipet is accurate to within approximately one drop of fluid. One drop is generally considered to be 0.05 ml. The operation and rinsing of this device is preferably automated, requiring as little operator input as possible.

The device is configured for effective rinsing, thereby eliminating contamination of one sample by the previous sample. Also, rinsing is simple and quick for minimizing operator time and skill. The device is further inexpensive to build, maintain and operate.

The pipet of the second embodiment of the invention is comprised of two, three or four chambers positioned so that the first is elevated above the second, the second above the third, and the third above the fourth.

The first or uppermost chamber is optional and shall be referred to herein as the fill chamber. The fill chamber is defined by a fill valve at its lower boundary and is configured so that liquid can be introduced to the pipet through this chamber. If a fill chamber is not provided, then liquid may be introduced directly through the fill valve. The fill chamber is available for sample preparation before the volumetric measurement when required.

The second chamber shall be referred to herein as the funnel chamber. The funnel chamber is provided to direct liquid into the third chamber. The upper end of the funnel chamber is defined by the fill valve, which permits selective communication of chamber 1 (fill chamber) with chamber 2 (funnel chamber). The lowest point in chamber 2 communicates with a liquid passage. The liquid passage is exclusively for liquid when filling the pipet. At some elevation in the funnel chamber is an imaginary line, i.e., the maximum liquid level line. When the funnel chamber is filled from the first chamber (fill chamber) the liquid settles below the maximum liquid level line. An air vent communicates with the funnel chamber. The air vent is used exclusively for air. The air vent communicates some point above the maximum liquid line in the funnel chamber with the third chamber (measuring chamber).

The third chamber or measuring chamber defines the volume of liquid to be measured. The uppermost point in the measuring chamber communicates with the air vent. The liquid passage enters the measuring chamber at some point below the uppermost point and communicates the measuring chamber with the second or funnel chamber. The liquid passage may be offset. The liquid passage preferably communicates with a drain line. The lowest point in the measuring chamber communicates with a measuring chamber drain passage to the fourth or trap chamber if provided or, alternatively, to a trap valve.

The fourth chamber or trap chamber is optional. The uppermost point in the trap chamber communicates with a dispense tube. The liquid passage from the third chamber or measuring chamber communicates with a location in the trap chamber below the uppermost point of the trap chamber. The lowest point in the trap chamber communicates with a trap valve. The trap chamber can be omitted and the two-way trap valve replaced with a three-way trap valve having a common valve port in communication with the measuring chamber and a second port in communication with the dispense line and third port.

A drain line and valve is provided for selectively communicating the liquid passage, which is between the funnel chamber and the measuring chamber, with some point outside the instrument. A gas valve and line selectively communicates with a location in the second or funnel chamber, above the maximum liquid level, providing gas pressure inside the pipet. The trap valve selectively communicates the trap chamber with a location outside of the instrument. The dispense tube communicates the uppermost point in the trap chamber with some location outside the instrument and delivers the measured volume.

The second embodiment provides several improvements over the first embodiment. For example, the location of the air vent and liquid passage in the top of the second or measuring chamber has been changed so that the air vent is at the highest elevation within the measuring chamber. This reduces the mixing of the evacuating air with the incoming liquid, reducing the chance of entraining air bubbles within the measured liquid. The result is improved precision.

The optional fourth or trap chamber and dispense tube have been added, and the dispense valve replaced with the trap valve. The filling of this device is substantially a 'first in, first out' process, i.e., the first liquid into the second chamber is the first into the third chamber and the first into the fourth chamber. Additionally, it is common industry practice to use the next liquid to be measured as a rinse media. So, with an excess of liquid to be measured and 'first in, first out' filling, the trap provides a chamber to isolate excess liquid that has been used to rinse the pipet. Optionally, another port can be added to the trap valve and the chamber eliminated, providing the same function. This feature provides a rinsing of the pipet with the perfect rinse media without any additional user input.

Further, the addition of the trap chamber allows the measuring chamber to function without a valve in contact with the measured liquid, thereby improving precision. That is, the addition of the trap chamber creates a measuring chamber wherein the measured liquid is supported by an excess of the same liquid rather than by a valve.

Another option is to offset segments of the liquid passage, i.e., the segment of the liquid passage exiting the funnel chamber may be offset from the segment of liquid passage entering into the measuring chamber, and connect the liquid passage with the drain line. This creates a trap, or small chamber. Once the trap is filled, additional liquid moves on to the measuring chamber. This improves both rinsing and precision. Rinsing is improved because the first liquid into the funnel chamber rinses the funnel chamber where it is contaminated and then caught in the trap. The contaminated liquid in the funnel chamber never gets into the measuring chamber. The drain valve may be opened to eliminate the excess liquid and to empty the liquid passage trap. Further, as the measured volume is being delivered from the device, residual liquid in the funnel chamber drips into the liquid passage trap. Without the trap the liquid would go directly to the measuring chamber and compromise the volumetric measurement. Again, both rinsing and accuracy are improved.

In operation the above changes reduce the steps required for operation of the device. The original device required replacing the rinse vessel with the receiving vessel after rinsing because the rinse liquid and measured liquid were dispensed at the same opening. Additionally, the improved design increases the precision and the effectiveness of rinsing.

The device is suitable for meeting or exceeding the precision requirements of class A volumetric glassware. The measuring chamber with separate passages for air and liquid is believed to be unique and provides a superior means of filling with liquid from the top and simultaneously evacuating the displaced air. Offsetting the liquid passages is also believed to be novel and increases the precision and the effectiveness of rinsing.

The need for positioning devices is eliminated with this automated pipet. The need for suction supply is also eliminated with this automated pipet, because separate openings for filling and dispensing are provided. The present invention has a measuring chamber with three openings.

This device is easier to rinse than known prior art devices in two ways. First, the default or home position of the valves and trap line allow the device to be rinsed without any positioning, movement of valves or any other manipulation. Simply pour the rinse media into the fill chamber and it passes through the device, rinsing as it goes. Second, the trap valve and optional trap chamber cause the device to rinse as it is filled. This unique feature is created by the presence of the trap valve and optional trap chamber.

The relation of the funnel chamber to the measuring chamber and the passages that allow communication between the two chambers allows for a small diameter liquid passage. With the present invention, liquid flows into the funnel chamber then into the measuring chamber. The funnel chamber allows for a smaller diameter liquid passage, thereby increasing precision.

The present invention is the only known top filling pipet that has a measuring chamber without a valve, and which successfully emulates the "drinking straw" style pipet.

A better understanding of the present invention, its several aspects, and its advantages will become apparent to those skilled in the art from the following detailed description, taken in conjunction with the attached drawings, wherein there is shown and described the preferred embodiment of the invention, simply by way of illustration of the best mode contemplated for carrying out the invention.

BRIEF DESCRIPTION OF THE DRAWINGS

Referring now to the drawings wherein like elements retain the same numerical designation in the several figures.

FIG. 8 is a schematic view of the pipet of FIG. 7 shown in a simple preparation configuration.

FIG. 9 is a schematic view of the pipet of FIG. 7 shown in a fill configuration.

FIG. 12 is a schematic view of the pipet shown in FIG. 7 shown in an excess liquid eliminated configuration.

FIG. 13 is a schematic view of the pipet of FIG. 7 shown in a sample dispense configuration.

DESCRIPTION OF THE PREFERRED EMBODIMENTS

Figure 1:
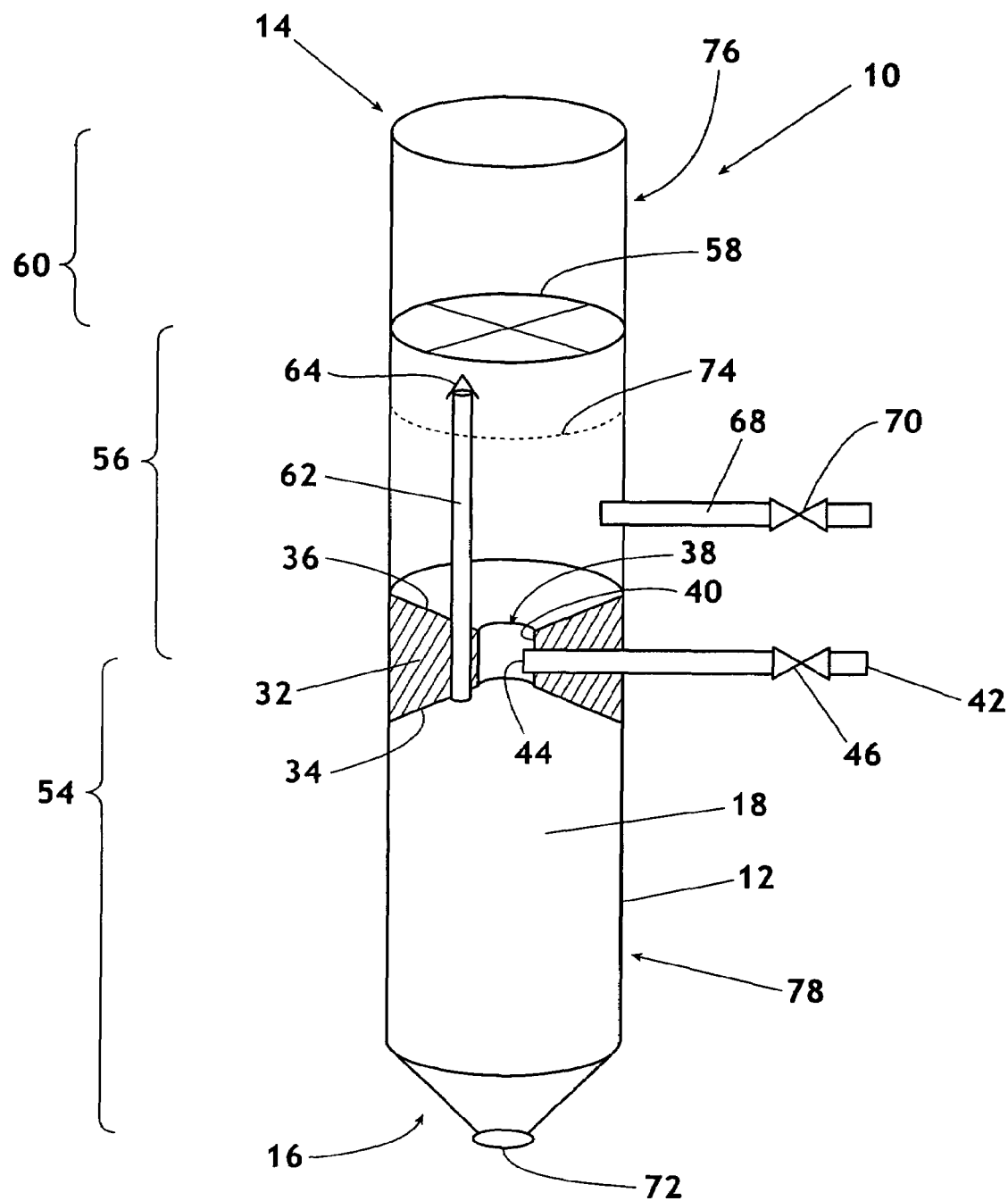
FIG. 1 is a schematic view of a pipet of the invention for sample or reagent measuring.

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

Referring now to FIGS. 1-6 shown are embodiments of a flow through pipet designated generally 10. Pipet 10 has a body 12. Body 12 has an upper end 14, a lower end 16 and defines an interior space 18. Supplied fluid is delivered to interior space 18 through or proximate to upper end 14.

Figure 2:
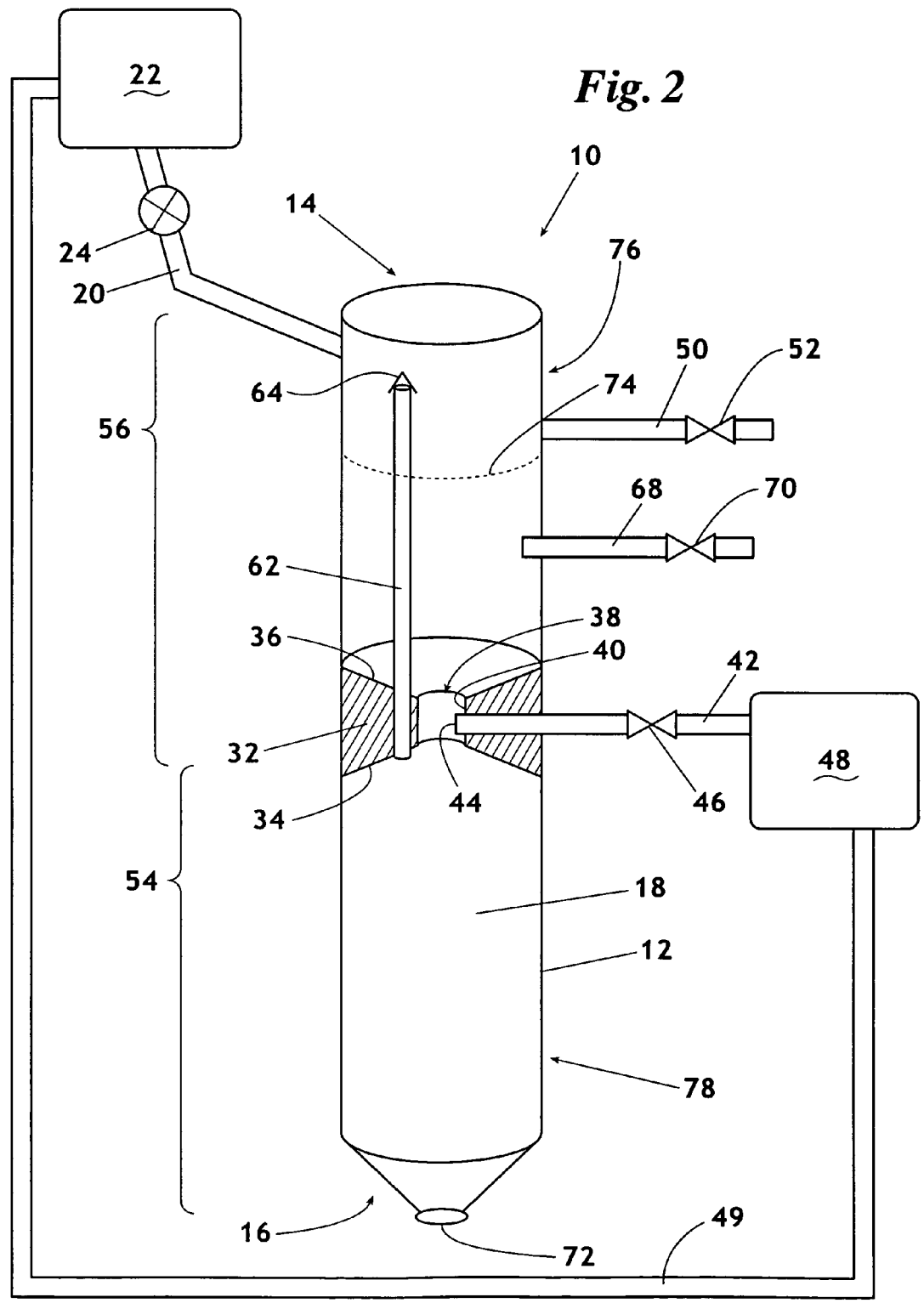
FIG. 2 is a schematic view of a pipet of the invention having a remote fluid supply, a pump, and a recirculation line for recirculating excess fluid.

In one embodiment, shown in FIG. 2, a fill line 20 is provided that communicates a remote fluid supply source 22 to interior space 18. Remote fluid supply source 22 may be a supply pump reservoir or other fluid supply source. Fill line 20 preferably communicates with interior space 18 proximate upper end 14 of body 12. A fill line valve 24 is preferably provided to control fluid flow from the fluid supply source 22.

Figure 3:
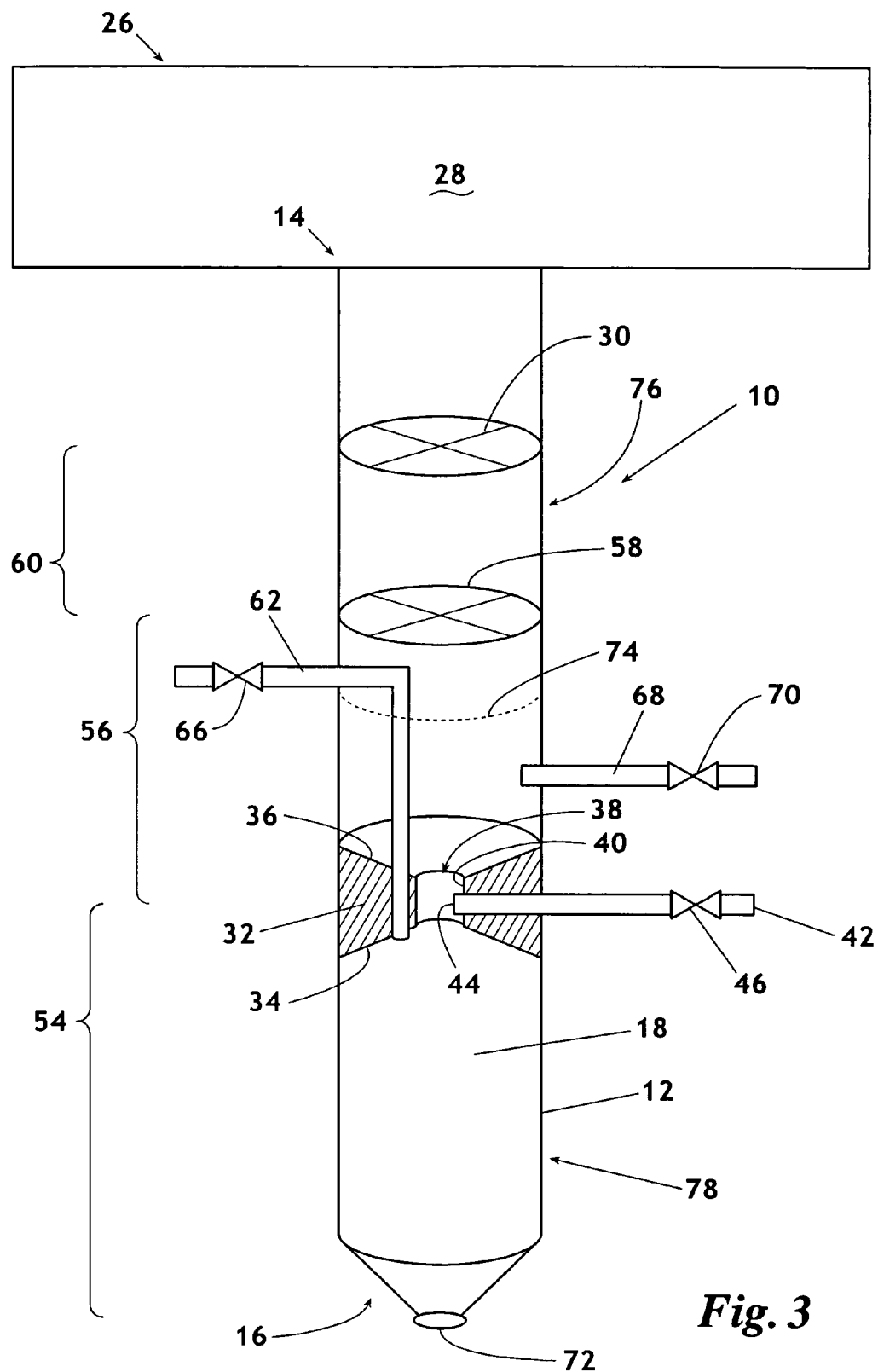
FIG. 3 is a schematic view of a pipet of the invention having a continuous supply source.

In another embodiment, shown in FIG. 3, the upper end 14 of body 12 communicates with a continuous supply source 26. Examples of a continuous supply source 26 include a process pipe, tank or other source. As shown in FIG. 3, a measured volume of fluid may be collected from process pipe 28. Still referring to FIG. 3, an isolation valve 30 is preferably provided to selectively allow supplied fluid into interior space 18 from the continuous supply source 26.

Referring back to FIGS. 1-3, a restriction member 32 may be provided in interior space 18 of body 12. Restriction member 32 has a lower surface 34, which may be conically shaped. Restriction member 32 additionally has an upper surface 36 which is preferably conical to assist in directing fluid toward a reduced area passageway 38. Reduced area passageway 38 is defined by inner walls 40 located between upper surface 36 and lower surface 34.

Still referring to FIGS. 1-3, drain line 42 has an inlet 44 that communicates with passageway 38 in interior space 18. When a restriction member 32 is used, drain line 42 preferably communicates with passageway 38. Placing inlet 44 in passageway 38 is advantageous because passageway 38 has a reduced diameter as compared to a diameter of body 12. The reduced diameter passageway 38 results in a reduced diameter of an upper surface of the fluid, thereby yielding a greater accuracy with respect to the fluid volume. A drain line valve 46 is provided to selectively open or close drain line 42.

Figure 4:
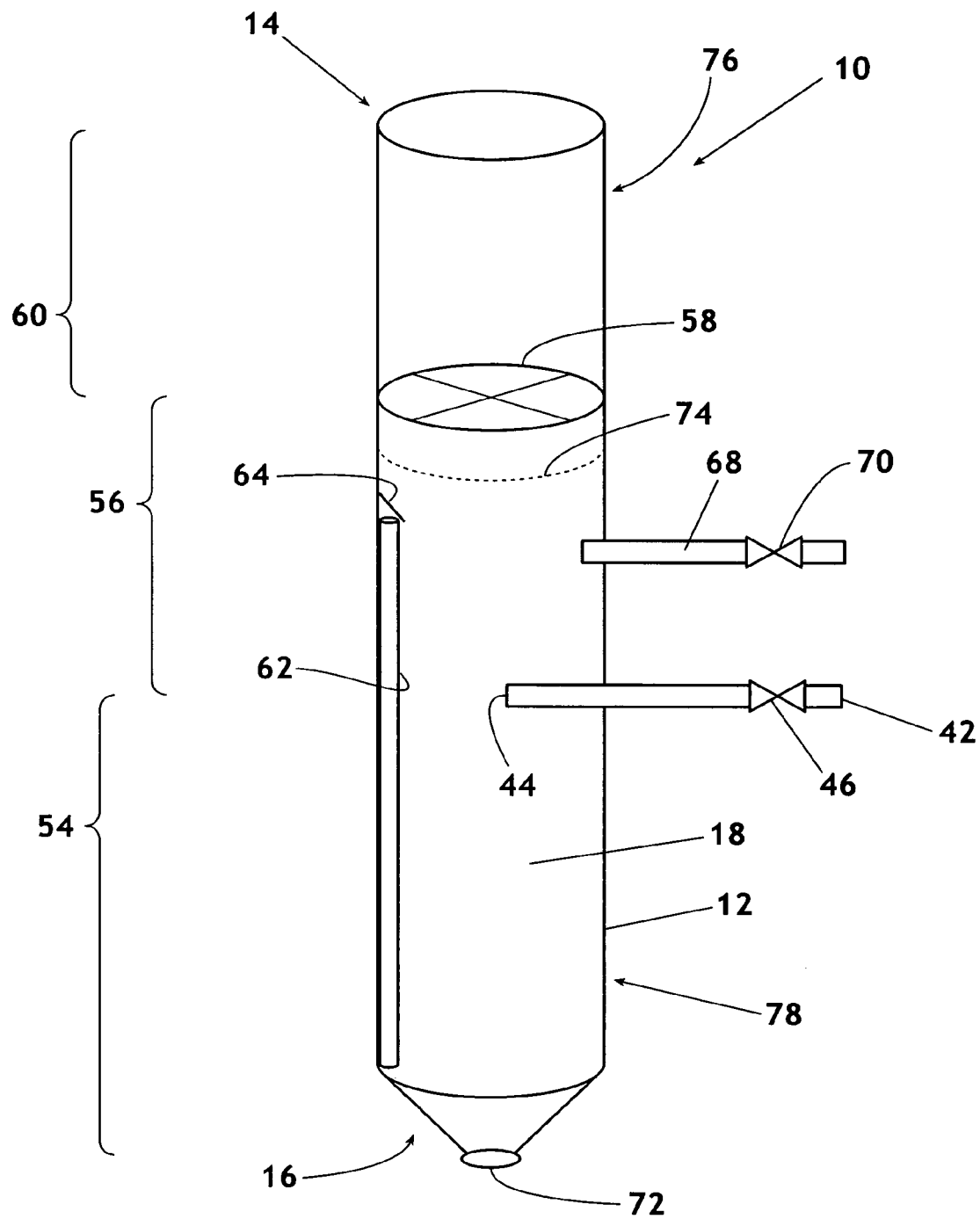
FIG. 4 is a schematic view of a pipet of the invention suitable for use with small volumes of fluid.
Figure 5:
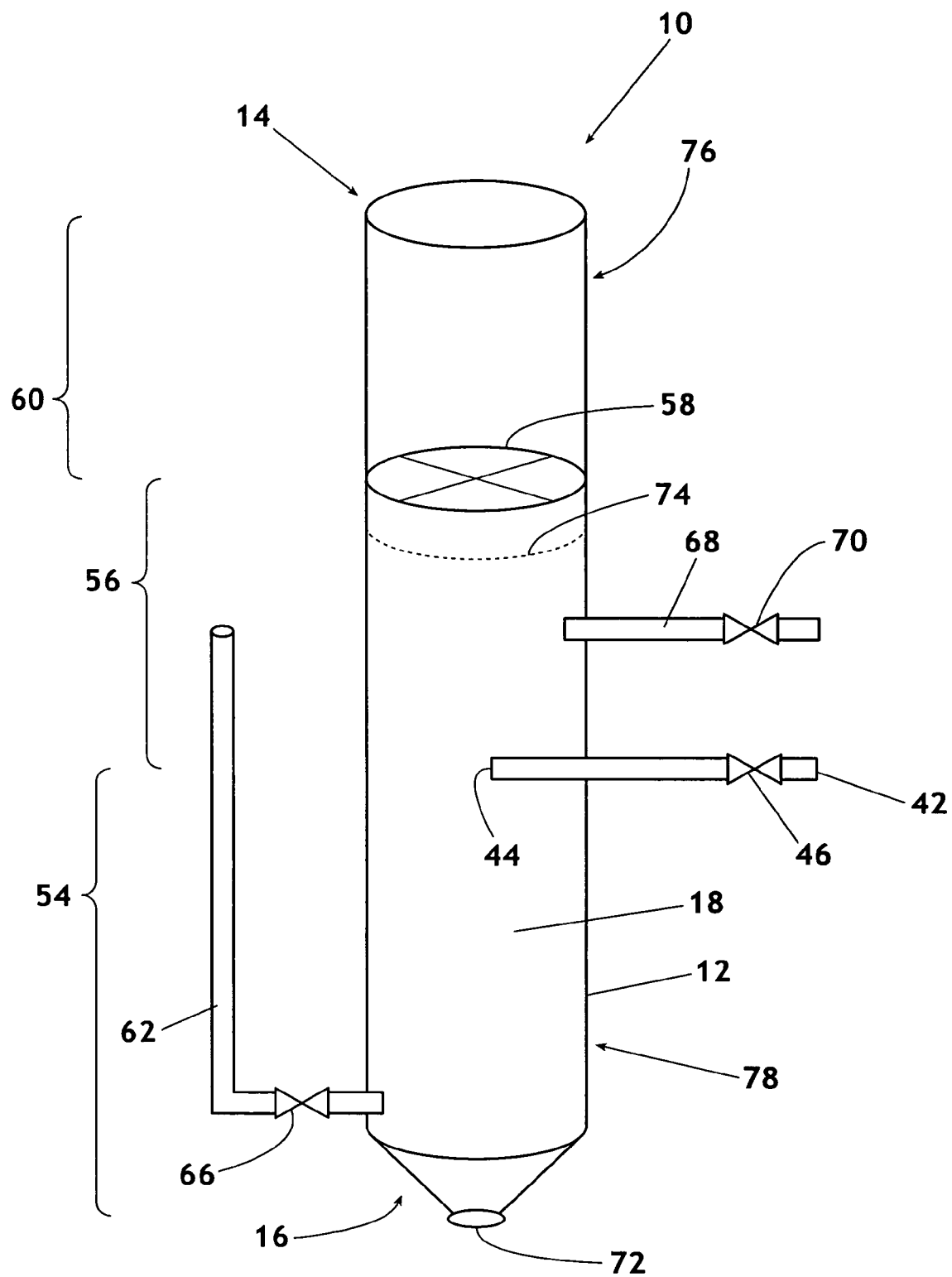
FIG. 5 is a schematic view of another embodiment of a pipet of the invention suitable for use with small volumes of fluid.

FIGS. 4 and 5 disclose pipets suitable for use with small volumes of fluid. Additionally, the pipets of FIGS. 4 and 5 could be used with any volume of fluid when less precision is required. The pipets of FIGS. 4 and 5 have no restriction members therein. Therefore, inlet 44 of drain line 42 communicates with interior space 18.

Inlet 44 defines an upper end of a measuring chamber 54 in interior space 18. Additionally, inlet 44 defines a lower end of an overflow chamber 56 in the interior space 18 (FIGS. 1-3). In all embodiments, drain line 42 defines a repeatable upper fluid level of the interior space 18 of pipet 10.

In one embodiment, shown in FIG. 2, drain line 42 communicates with a pump 48, which is used to draw excess fluid from interior space 18. The excess fluid may then be pumped through recirculation line 49 back to remote fluid supply source 22 or discarded as desired. Still referring to FIG. 2, if a drain line pump 48 is used to suck excess fluid from the interior space 18, then it is desirable to provide a pressure equalization line 50 with a pressure equalization valve 52 to allow gas to enter interior space 18 when drain line pump 48 is activated.

Referring now to FIGS. 1 and 3-5, a fill valve 58 is located in body 12 to isolate a fluid supply from a measured fluid that is located in measuring chamber 54. Fill valve 58 defines an upper end of overflow chamber 56 and defines a lower end of fill chamber 60 (FIGS. 1 and 3-5). Fill valve 58 selectively permits fluid to pass from fill chamber 60 to overflow chamber 56.

Referring now to FIGS. 1, 2 and 4, a vent line 62 is provided that communicates the overflow chamber 56 with measuring chamber 54. As shown in FIGS. 1, 2 and 4, vent line 62 is located in the interior space 18 of body 12. It is desirable to provide a weather cap 64 (FIGS. 1, 2 and 4) on an upper end of vent line 62 so that when fluids are delivered to interior space 18, fluids are prevented from entering an upper end of the vent line 62.

In other embodiments, as shown in FIGS. 3 and 5, vent line 62 communicates with an exterior of body 12. In embodiments having an exterior vent line 62, it may be desirable to provide a vent valve 66 (FIGS. 3 and 5).

A compressed gas line 68 may be provided for communicating a compressed gas source with interior space 18 (FIGS. 1-6). A compressed gas valve 70 may be provided to control access of compressed gas to the body 12. Compressed gas may be useful in forcing fluids out of lower end of 16 the pipet 10. However, compressed gas may be substituted by the use of gravity to dispense fluids from the body 12 with the pipet 10 of the invention.

A dispense valve 72 is provided on lower end 16 of body 12. Dispense valve 72 allows for selective dispensing of a fluid from measuring chamber 54. Dispense valve 72 may be any type of suitable valve known in the art. However, in a preferred embodiment, dispense valve 72 is pressure actuated. Additionally, dispense valve 72 may be manually actuated, electronically actuated, or actuated by other means.

A junction 74 may be provided so that body 12 is separatable into an upper segment 76 and a lower segment 78. Upper segment 76 and lower segment 78 may be connected at junction 74 by threads, cooperating detents and protrusions, clips or other means.

Figure 6:
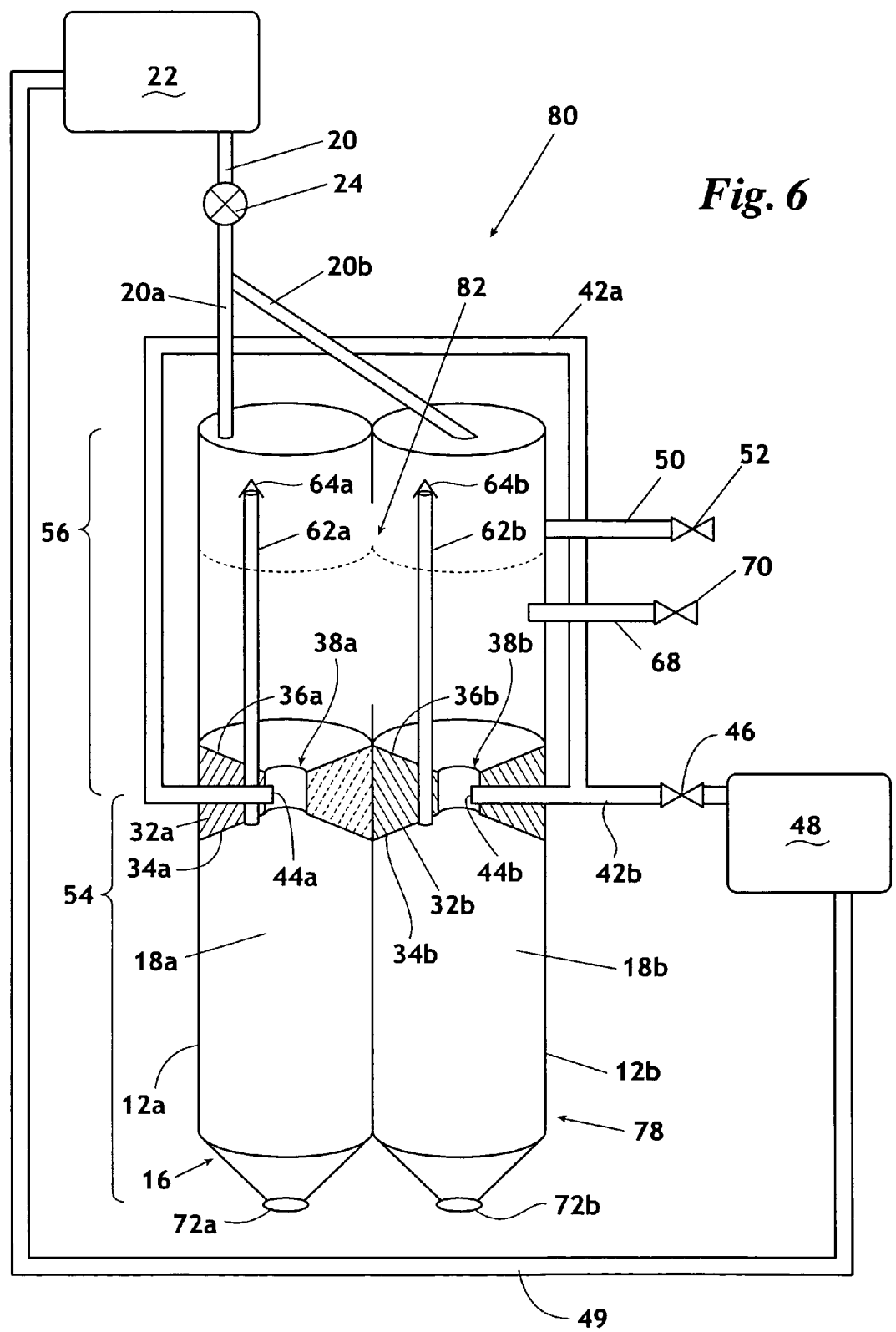
FIG. 6 is a schematic view of the pipet of the invention incorporated into a multi-pipet assembly.

FIG. 6 shows a multi-pipet assembly 80 having a fill line 20 that has multiple branches that communicate a remote fluid supply source 22 to interior space 18*a* and 18*b* of bodies 12*a* and 12*b*, respectively. Although only two pipet bodies, 12*a* and 12*b*, are shown for purposes of example, it should be noted that any number of pipet bodies 12*a*, 12*b*, 12*c* . . . may be incorporated into the multi-pipet assembly 80 of the invention. It should also be noted that like elements of multi-pipet assembly 80 to elements of embodiments shown in FIGS. 1-5 have retained the same numerical designation in FIG. 6, with the exception that "a" or "b" has been appended to some of the numbers to designate to which of the pipet bodies 12*a, b* that the numeral designations refer. For example, in a manner similar to that of the embodiment of FIG. 2, drain line pump 48 draws excess fluid from interior space 18*a* and 18*b* through drain line branches 42*a* and 42*b*. The excess fluid may then be directed through recirculation line 49 back to remote fluid supply source 22 or discarded as desired. A single pressure equalization line 50 and compressed gas line 68 may be provided, which are capable of acting upon interior spaces 18*a*, 18*b*, etc., since interior spaces 18*a*, 18*b*, etc. communicate with one another via passageway 82. Alternatively, pressure equalization line 50 and compressed gas line 68 may provide individual branches for communicating with each of interior spaces 18*a*, 18*b*, etc.

In use, a fluid is delivered into measuring chamber 54 through an upper end 14 of body 12. Fluid in excess of a desired amount drains out of drain line 42. By draining fluid out of drain line 42, an upper fluid level is established in interior space 18. The upper fluid level defines a predetermined volume of fluid in measuring chamber 54. The predetermined volume of fluid may then be dispensed out of lower end 16 of body 12 through dispense valve 72. The dispense valve 72 may be electronically actuated, manually actuated or actuated by other methods.

In one embodiment, e.g., as shown in FIGS. 1-3 and 6, the surface area of the fluid may be restricted or reduced in size as compared to the dimensions of the interior space 18 by providing a restriction member 32. For example, the drain line 42 may be located to communicate with an inner wall 40 of a restriction member 32, thereby establishing an upper fluid level having a reduced or restricted service area. Minimizing the surface area of the fluid surface minimizes measurement error of the pipet.

To prevent gas from being trapped in the measuring chamber 54, a vent line 62 (FIGS. 1-6) may be provided. By separating the vent line 62 from the passageway 38 (FIGS. 1-3 and 6), gas may simultaneously escape from measuring chamber 54 while measuring chamber 54 is being filled with the fluid.

The delivery of fluid into interior space 18 may be accomplished via a fill line 20 (FIGS. 2 and 6), which delivers fluid to an area proximate upper end 14 of the body 12. Additionally, fluid may be delivered directly into upper end 14 of body 12 via manual delivery or delivery from a remote fluid supply source 22 (FIGS. 2 and 6) or a continuous supply source 26 (FIG. 3).

Referring back to FIGS. 2 and 6, it may be desirable to provide a pump 48 for sucking excess fluid from the interior space 18. To minimize waste of the fluid, a recirculation line 49 may be provided to route excess fluid back to a remote fluid supply source 22 where the fluid can be reintroduced into the interior space 18 via fill line 20.

Dispensing the predetermined volume of fluid may be achieved by gravity feed or, alternatively, by delivering compressed gas into the interior space 18 to force the fluid out of lower end 16 of body 12. To deliver compressed gas to interior space 18, compressed gas valve 70 is opened and gas is delivered through line 68 into interior space 18 at a location above the drain line 42.

Referring now to FIGS. 4 and 5, for dispensing very small amounts of a predetermined volume of fluid, it may be unnecessary to provide a restriction member 32, as shown in FIGS. 1-3, in the interior space 18 of the body 12. However, it may still be desirable to provide a structure for venting gas from measuring chamber 54 when fluid is delivered to the measuring chamber 54. In particular, for a very small diameter of body 12, incoming fluid may not readily permit trapped gas to escape. Therefore, in one embodiment, vent line 62 may be provided within interior space 18, where the vent line 62 has a lower opening at a location below the inlet 44 of drain line 42 and has an upper opening at a location above the inlet 44 of drain line 42. Weather cap 64 is preferably provided above the vent line 62 of FIG. 4 to prevent fluid from entering the upper opening of vent line 62. In another embodiment, as shown in FIG. 5, the vent line 62 may be provided externally to the body 12. A vent valve 66 may be provided on vent line 62.

Referring back to FIG. 3, delivery from a continuous supply source 26 may be desirable to provide a sampling device for a process stream. In this embodiment, isolation valve 30 is selectively opened to admit fluid from process pipe 28. The fluid then fills the fill chamber 60. Fill valve 58 may then be opened to allow the fluid to pass from the fill chamber 60 through overflow chamber 56, through passageway 38 and into measuring chamber 54. As the fluid fills measuring chamber 54, displaced gas is vented out through vent line 62. In this embodiment, the vented gas is vented to an exterior of body 12 through vent line 62. Once the fluid level in the measuring chamber 54 rises to the inlet 44 of level of the drain line 42, any excess fluid is drained out of interior space 18, e.g., any fluid rising into overflow chamber 56 will be drained out of interior space 18, thereby establishing a maximum volume of fluid in the measuring chamber 54.

If it is desired to use a pipet 10 having a fill valve 58, a drain valve 46 on a drain line 42, a gas valve 70 on a compressed gas line 68 and a dispense valve, then a prescribed sequence of opening and closing various valves 58, 46, 70 and 72 is desirable for operating the pipet. Below is an example sequence of valve operation. The valve operation may be varied without adversely affecting the accuracy and precision of the inventive pipet.

Description of steps:
0. Start with valves 46, 58, 70 and 72 closed.
1. Fluid is delivered through the fill valve 58. The fluid flows through the passageway 38 through the restriction member 32 and into the measuring chamber 54.
2. The drain valve 46 is opened and excess liquid drained out of the manifold.
3. The fill valve 58 is closed.
4. Gas valve 70 is opened briefly to ensure that excess liquid drains through the drain valve 46 and into drain line 42.
5. The drain valve 46 is closed.
6. The compressed gas valve 70 is opened. The increased pressure inside interior space 18 activates a pressure actuated dispense valve 72 to allow the measured liquid within measuring chamber 54 to exit via the open dispense valve 72.
7. The compressed gas valve 70 is closed.
8. The drain valve 46 is opened to relieve pressure.
9. Step 5 is repeated
10. Step 6 is repeated
11. Step 7 is repeated
12. Step 8 is repeated
13. Step 9 is repeated Alternatively, step 9 could comprise "close drain valve 46" and steps 10-13 could be eliminated. Steps 10-13 are cautionary to ensure that all measured liquid has been discharged.

Steps for one method of operation are presented in the below Table.

| Step | Fill Valve 58 | Drain Valve 46 | Gas Valve 70 | Dispense Valve 72 |
| --- | --- | --- | --- | --- |
| 0 | Close | Close | Close | Close |
| 1 | Open | Close | Close | Close |
| 2 | Open | Open | Close | Close |
| 3 | Close | Open | Close | Close |
| 4 | Close | Open | Pulse | Close |
| 5 | Close | Close | Close | Close |
| 6 | Close | Close | Open | Open |
| 7 | Close | Close | Close | Close |
| 8 | Close | Open | Close | Close |
| 9 | Close | Close | Close | Close |
| 10 | Close | Close | Open | Open |
| 11 | Close | Close | Close | Close |
| 12 | Close | Open | Close | Close |
| 13 | Close | Close | Close | Close |

As described above, a novel pipet is taught for automatically and inexpensively extracting an aliquot of liquid from one source, measuring a predetermined volume of the liquid and transferring the volume of liquid to a different vessel. Benefits of the novel pipet include simplicity and therefore low expense to manufacture, ease of automation, minimization of the volume of liquid that must be used to rinse the apparatus, elimination of a need to reposition the pipet after liquid has been introduced into the pipet, elimination of expensive syringe pumps that are used in typical automated pipetting systems, elimination of the use of suction to fill the pipet with liquid, and use of gravity and overflow rather than a syringe pump to measure volume.

Referring now to FIGS. 7-13, shown is a second embodiment of the pipet of the invention which will be referred to as pipet 100. Pipet 100 has four chambers: a fill chamber 102, a funnel chamber 104, measuring chamber 106 and a trap chamber 108. A first barrier 110 separates funnel chamber 104 from measuring chamber 106. A second barrier 112 separates the measuring chamber 106 from the trap chamber 108. A third barrier 114 may be provided to define a lower surface of trap chamber 108.

Fill chamber 102 is preferably defined at a lower end by fill valve 116. Funnel chamber 104 is defined at an upper end by fill valve 116 and a lower end by first barrier 110. A maximum liquid level 118 inside funnel chamber 104 is offset some distance from fill valve 116. Space between maximum liquid level 118 and fill valve 116 defines air space 120. Funnel chamber 104 defines a low point 122. Low point 122 communicates with liquid passage 124 which passes through first barrier 110.

Measuring chamber 106 is defined on an upper end by first barrier 110 and a lower end by second barrier 112. Measuring chamber 106 defines an upper point 126 and a low point 128. Liquid passage 124 communicates with measuring chamber 106 at a location below upper region 126. A measuring channel outlet line 130 preferably communicates with low point 128 of measuring chamber 106. Measuring chamber outlet line 130 passes through second barrier 112.

Trap chamber 108 is defined at an upper end by second barrier 112 and at a lower end by third barrier 114. Trap chamber 108 defines an upper point 134 and a lower point 136. Measuring chamber outlet line 130 preferably communicates with trap chamber 108 at a location below upper point 134 of trap chamber 108. Trap drain line 138 preferably communicates with low point 136 of trap chamber 108. Trap valve 140 is provided on trap drain line 138.

A pressurized gas line 150 is provided for communicating a compressed gas source with air space 120 in funnel chamber 104. Gas line valve 152 is provided for selectively opening and closing gas line 150.

Air vent line 154 passes through first barrier 110 and communicates upper point 126 of measuring chamber 106 with air space 120, i.e., with a location above maximum liquid level 118 in funnel chamber 104.

Drain line 156 is provided to communicate an interior of pipet 100 with a location external to pipet 100. Drain line 156 preferably communicates with liquid passage 124. In a preferred embodiment, liquid passage 124 is made up of an upper segment 124a which is offset from lower segment 124b as is shown in FIGS. 7-13. In a preferred embodiment, drain line 156 is offset from horizontal so that excess liquid passing through the upper leg of liquid passage 124 must first fill drain line 156 before spilling into measuring chamber 106. Drain line 156 is provided with a drain line valve 158 for selectively opening or closing drain line 156.

A dispense tube 160 preferably communicates upper region 134 of trap chamber 108 with an exterior of pipet 100. Dispense tube 160 passes through first barrier 110 and exits pipet 100 at a location proximate air space 120. Dispense tube 160 delivers fluid to sample receptacle 162.

Figure 7:
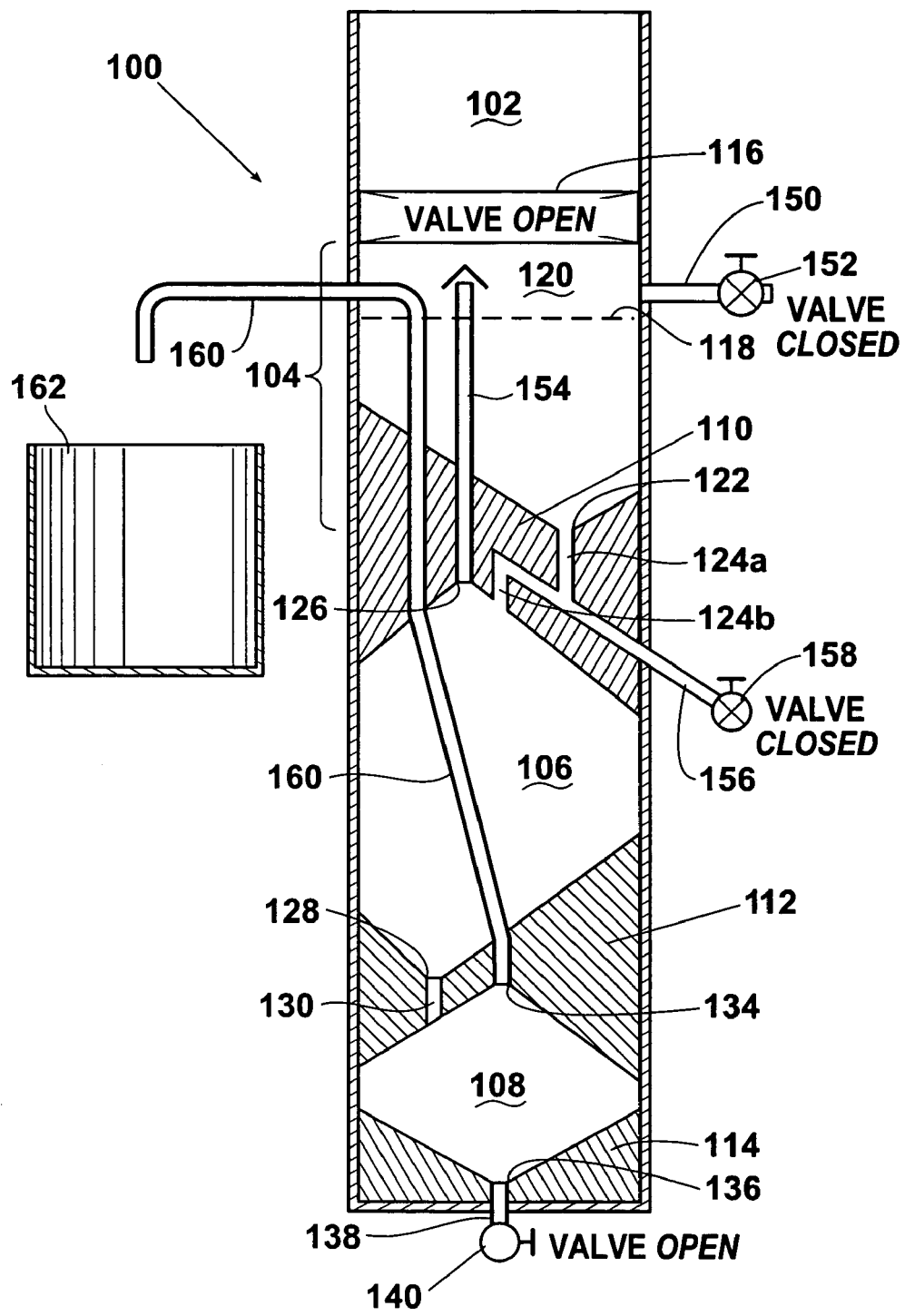
FIG. 7 is a schematic view of a second embodiment of a pipet of the invention in a default or home position.

Referring now particularly to FIG. 7, shown is the default or home configuration of pipet 100, i.e., a configuration where fill valve 116 is open, drain valve 158 is closed, trap valve 140 is open and gas valve 152 is closed. In this configuration, pipet 100 is ready for rinsing. Rinse media is first poured into fill chamber 102. The rinse media then passes through funnel chamber 104, measuring chamber 106 and into trap chamber 108. The rinse media is then released through trap drain line 138.

Referring now to FIG. 8, pipet 100 is shown in a sample preparation configuration, i.e., a configuration where fill valve 116 is closed, drain valve 158 is closed, trap valve 140 is closed and gas valve 152 is closed. In this step, liquid 164 is delivered to fill chamber 102 where it remains since fill valve 116 is closed. Sample preparation can now be executed.

Referring now to FIG. 9, pipet 100 is shown in a fill configuration, i.e., a configuration where fill valve 116 is open, drain valve 158 is closed, trap valve 140 is closed and gas valve 152 is closed. Fill valve 116 is opened allowing liquid 164 to pass into funnel chamber 104 and to travel through liquid passage 124, through measuring chamber 106, to trap chamber 108. As trap chamber 108 fills, along with measuring chamber 106, air evacuates through air vent line 154. Once both trap chamber 108 and measuring chamber 106 is full, funnel chamber 104 holds any excess liquid. This can be seen in FIG. 9 where the upper surface of liquid 164 is constant through the lower portion of funnel chamber 104, the air vent line 154 and dispense tube 160. The design of the pipet results in impressive precision, which is largely the result of the unique measuring chamber design: separate passages for air and liquid that provide a superior means of filling, i.e., liquid fills from the top while simultaneously evacuating the displaced air.

Figure 10:
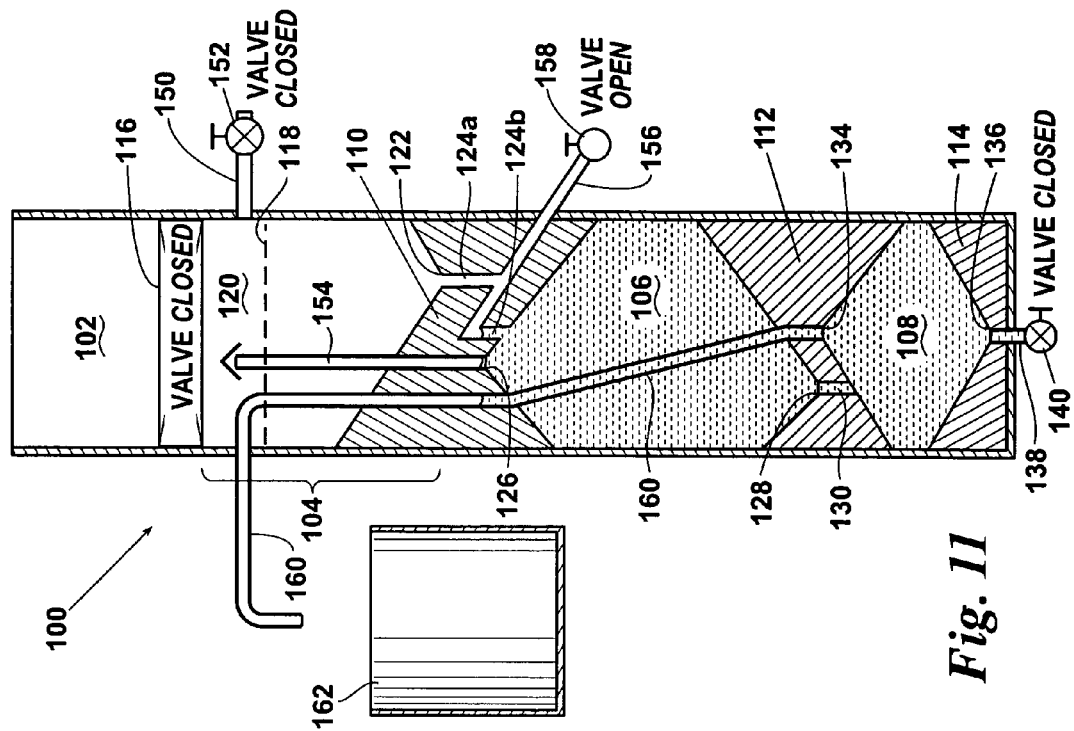
FIG. 10 is a schematic view of the second embodiment of the pipet of the invention shown in an excess liquid elimination configuration.

Referring now to FIG. 10, wherein pipet 100 is shown in an excess liquid elimination configuration, i.e., a configuration where fill valve 116 is open, drain valve 158 is open, trap valve 140 is closed and gas valve 152 is closed. At this time, drain line valve 158 is opened so that all liquid above the upper drain point 157 of drain line 156 is evacuated out of pipet 100. It is noted that any liquid remaining in funnel chamber 104 is now unable to enter measuring chamber 106 due to the bifurcated liquid passage 124 and angled drain line 156. The ability to prevent additional liquid from dropping into the measuring chamber 106 once a measured amount is achieved enables the precision of this device to meet or exceed the precision requirements of class A volumetric glassware as specified in ASTM E969-02. ASTM E969-02 specifies that the tolerance of a class A 100 ml pipet be less than +/−0.08 ml. Applicant has observed accuracy in repeated samples to be between −0.05 milliliters and the +0.02 milliliters, which is well within the limits of class A tolerance for a 100 ml pipet.

Referring now to FIG. 12, pipet 100 is shown in a fill valve closed configuration, i.e., a configuration where fill valve 116 is closed, drain valve 158 is closed, trap valve 140 is closed and gas valve 152 is closed. In this configuration, pressure may be applied through compressed gas line 150. Gas line valve 152 is opened so that compressed gas may be delivered through compressed gas line 150 and into pipet 100. The pressurized gas forces the level of liquid 164 level down until the upper liquid level drops into trap chamber 108. Therefore, the repeatable measured volume delivered into a sample reservoir 162 is the amount of liquid present in measurement chamber 106 plus the amount present in liquid passage 124b, in dispense tube 160, chamber outlet line 130 and a portion of trap chamber 108 as shown in FIGS. 12 and 13.

The table below summarizes the position of valves in the various configurations:

| Step | Fill Valve | Drain Valve | Gas Valve | Trap Valve |
|---|---|---|---|---|
| 0 | Open | Closed | Closed | Open |
| 1 | Closed | Closed | Closed | Closed |
| 2 | Open | Closed | Closed | Closed |
| 3 | Open | Open | Closed | Closed |
| 4 | Closed | Open | Closed | Closed |
| 5 | Closed | Closed | Closed | Closed |
| 6 | Closed | Closed | Open | Closed |

Description of steps from table above:

Step 0, as shown in FIG. 7 Pipet 100 is shown in a default or home position. Pipet 100 is ready for rinsing; rinse media is poured into fill chamber 102, the uppermost chamber, passes through chambers 104, 106 & 108, and exits through trap valve 140.

Step 1, as shown in FIG. 8 Liquid 164 is delivered to fill chamber 102. Sample preparation can be executed at this step.

Step 2, as shown in FIG. 9 Liquid 164 fills funnel chamber 104, travels through the liquid passage 124, through the measuring chamber 106, fills trap chamber 108. After the trap fills, measuring chamber 106 fills, and air evacuates through the air vent 154. After measuring chamber 106 fills, funnel chamber 104 holds excess liquid.

Step 3, as shown in FIG. 10 Excess liquid 164 is eliminated through the drain line.

Figure 11:
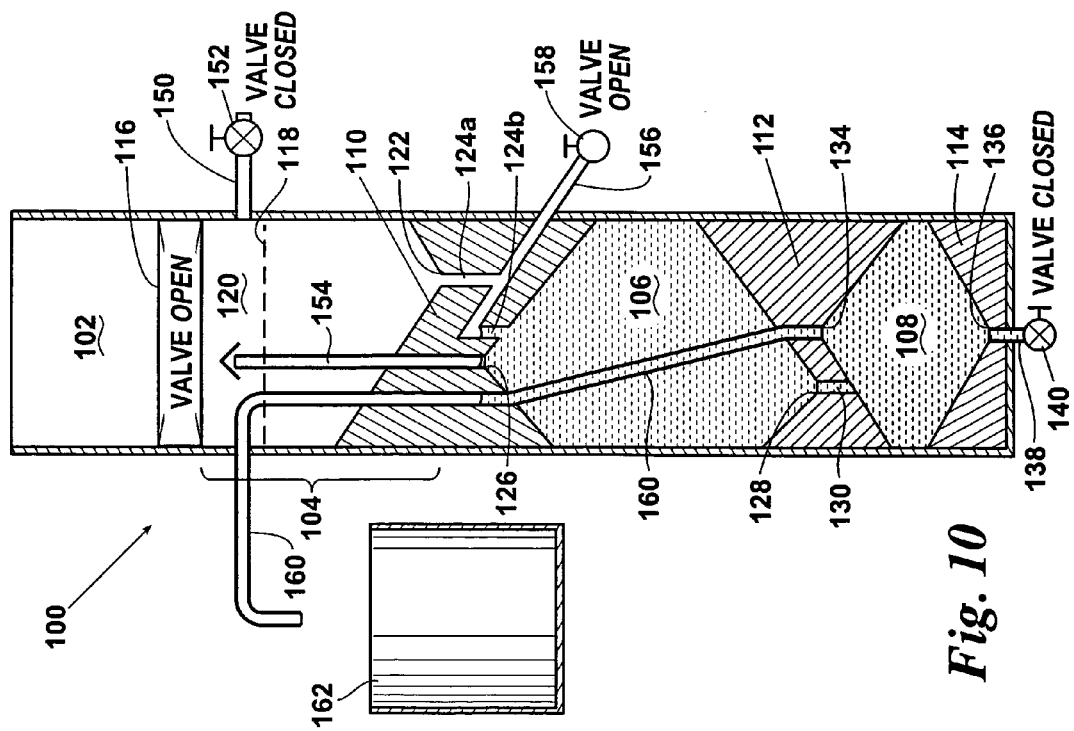
FIG. 11 is a schematic view of the pipet of the invention shown in a fill valve closed configuration.

Step 4, as shown in FIG. 11 Close fill valve 116.

Step 5, as shown in FIG. 12 Excess liquid has been eliminated.

Step 6, as shown in FIG. 13 Pressure administered through gas line 150 causes liquid to exit through the only opening, i.e., dispense tube 160; until liquid level drops below the end of the dispense tube 160, i.e., into trap chamber 108.

While the invention has been described with a certain degree of particularity, it is understood that the invention is not limited to the embodiment(s) set for herein for purposes of exemplification, but is to be limited only by the scope of the attached claim or claims, including the full range of equivalency to which each element thereof is entitled.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A device for measuring a quantity of liquid, said device comprising:
   a body having an interior;
   a measuring chamber in said interior of said body, said measuring chamber having a wall engaging a first passageway, a second passageway and a third passageway;
   a fill valve for selectively closing off said measuring chamber from an exterior of said body;
   wherein said first passageway is an inlet into said measuring chamber that delivers liquid, said second passageway is a vent for allowing air to evacuate said measuring chamber simultaneous to said measuring chamber being filled through said inlet, and said third passageway for exiting a measured amount of liquid from said measuring chamber;
   wherein said first passageway, said second passageway and said third passageway remain unobstructed at all times during operation for decreasing complexity and increasing reliability of the device; and
   wherein said measuring chamber remains upright during use.

2. The device according to claim 1 wherein:
   a quantity of said liquid to be measured within said measuring chamber is defined without said quantity of liquid to be measured contacting a fluid pathway closure.

3. The device according to claim 1 further comprising:
   a trap chamber within said body and located beneath said measuring chamber that receives liquid a from said measuring chamber, said trap chamber in selective communication with an exterior of the device via a trap drain passageway.

4. The device according to claim 3 wherein:
   said trap chamber is provided for holding liquid that passed through said measuring chamber for the purposes of rinsing.

5. The device according to claim 1 wherein:
   said inlet comprises an inlet/trap combination that includes an upper segment and a lower segment, said inlet/trap combination further comprising a drain line in communication with an upper end of said lower liquid passageway segment and with a lower end of said upper segment; and
   wherein said upper end of said lower segment is above said lower end of said upper segment so that any liquid draining through said upper segment will be directed away from said lower segment unless said drain line is closed, in which case, said drain line must fill before liquid spills into said lower segment.

6. The device according to claim 1 wherein:
   said liquid to be measured enters said measuring chamber at a location proximate an upper end of said measuring chamber; and
   air exits said measuring chamber at a higher elevation than said liquid enters said measuring chamber.

7. A device for measuring a quantity of liquid, said device comprising:
   a measuring chamber having a wall engaging a first passageway, a second passageway and a third passageway;
   wherein said first passageway is an inlet into said measuring chamber that delivers liquid, said second passageway is a vent for allowing air to evacuate said measuring chamber simultaneous to said measuring chamber being filled through said inlet, and said third passageway for exiting a measured amount of liquid from said measuring chamber;
   wherein said first passageway, said second passageway and said third passageway remain unobstructed at all times during operation for decreasing complexity and increasing reliability of the device;
   wherein said measuring chamber remains upright during use;
   a trap chamber located beneath said measuring chamber that receives liquid from said measuring chamber, said trap chamber in selective communication with an exterior of the device via a trap drain passageway; and
   a dispense tube for exiting liquid from said trap chamber from an uppermost point of said trap chamber, wherein said uppermost point of said trap chamber is above a location of entry of said liquid into said trap chamber.

8. A device for measuring a quantity of liquid, said device comprising:
   a measuring chamber having a wall engaging a first passageway, a second passageway and a third passageway;
   wherein said first passageway is an inlet into said measuring chamber that delivers liquid, said second passageway is a vent for allowing air to evacuate said measuring chamber simultaneous to said measuring chamber being filled through said inlet, and said third passageway for exiting a measured amount of liquid from said measuring chamber;
   wherein said first passageway, said second passageway and said third passageway remain unobstructed at all times during operation for decreasing complexity and increasing reliability of the device;
   wherein said measuring chamber remains upright during use;
   a trap chamber located beneath said measuring chamber that receives liquid from said measuring chamber, said trap chamber in selective communication with an exterior of the device via a trap drain passageway; and
   a quantity of said liquid to be measured within said measuring chamber is supported within said device by excess liquid in said trap chamber.

* * * * *